United States Patent [19]

Fukayama et al.

[11] 4,447,576
[45] May 8, 1984

[54] ROOM TEMPERATURE VULCANIZABLE POLYORGANOSILOXANE COMPOSITIONS WHICH ARE PAINTABLE FOLLOWING CURING

[75] Inventors: Miyoji Fukayama; Chikara Ichiijo, both of Ichihara, Japan

[73] Assignee: Toray Silicone Company, Ltd., Tokyo, Japan

[21] Appl. No.: 501,954

[22] Filed: Jun. 7, 1983

[30] Foreign Application Priority Data

Jun. 9, 1982 [JP] Japan .................................. 57-99044

[51] Int. Cl.³ .............................................. C08K 5/16
[52] U.S. Cl. .................................. 524/714; 524/724; 524/726; 524/750; 524/761; 524/762; 524/765; 524/773; 524/379; 524/208; 524/221; 524/233; 524/247; 524/284; 524/317; 524/392; 524/788; 524/783; 524/789; 524/863; 524/864; 524/588; 524/425; 524/437; 524/431; 524/448
[58] Field of Search ............... 524/714, 724, 726, 750, 524/761, 762, 765, 773, 379, 208, 221, 233, 247, 284, 317, 392, 788, 783, 789, 863, 864, 588, 425, 437, 431, 448

[56] References Cited

U.S. PATENT DOCUMENTS 4,358,558 11/1982 Shimizu .............................. 524/379

Primary Examiner—Melvyn I. Marquis
Attorney, Agent, or Firm—Robert Spector

[57] ABSTRACT

Paintable, cured polyorganosiloxane sealants are prepared at room temperature from room temperature curable compositions containing a hydroxyl-terminated polyorganosiloxane, an organosilicon compound containing at least two amido groups, aminoxy groups or combinations thereof, per molecule and a substituted alcohol where the substituent is acyloxy, alkoxycarbonyl, cyano,

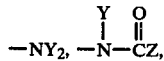

mercapto, or the combination of a carbon-to-carbon triple bond and an ether-type oxygen atom, where each Y and Z are individually selected from the group consisting of hydrogen, hydrocarbyl and halohydrocarbyl.

18 Claims, No Drawings

ROOM TEMPERATURE VULCANIZABLE POLYORGANOSILOXANE COMPOSITIONS WHICH ARE PAINTABLE FOLLOWING CURING

BACKGROUND OF THE INVENTION

1. Field of the Invention

This invention relates to room temperature-vulcanizable polyorganosiloxane compositions. More particularly, this invention relates to room temperature, vulcanizable polyorganosiloxane compositions having a surface that can be readily coated with paint following room temperature vulcanization.

2. Description of the Prior Art

It is known that a hydroxyl-terminated polyorganosiloxane can be vulcanized or cured at room temperature to form an elastomer by reacting it with an organosilicon compound containing amido groups and/or an organosilicon compound containing aminoxy groups as the curing agent. Typically such room temperature curable compositions contain both a bifunctional curing agent and one containing three or more amide or aminoxy groups per molecule. By varying the ratio of these two types of curing agents it is possible to obtain a wide range of properties in the cured elastomer, from low modulus—high elongation to high modulus—low elongation. In particular, low modulus—high elongation compositions are widely used as sealants by the construction industry because these products exhibit excellent weather and fatigue resistance. Japanese Patent Publication (Kokai) No. 56[81]-86951, which was published on July 15, 1981, discloses compositions of this type which contain an aminoxy-substituted organosilicon compound in addition to an alcohol that is added to achieve curing only at the surface of the composition while the interior portion remains uncured.

The most significant drawback of the sealants disclosed in the preceding paragraph is that the surface of the cured sealant is either difficult to coat with paint or cannot be painted. For the purpose of this invention, paintability or coatability is defined as the ability of a paint to coat and adhere to a surface. Although silicone rubber sealants possess excellent properties, they are limited in their applications because of poor paintability.

U.S. Pat. No. 4,358,558, which issued to C. Shimizu on Nov. 9, 1982 from application Ser. No. 334,014 filed Dec. 23, 1981, discloses room temperature curable polyorganosiloxane compositions which are paintable in the cured state and which contain a silanol-terminated polydiorganosiloxane having a viscosity of from $1 \times 10^{-4}$ to 0.2 m$^2$/sec. at 25° C., an organosilicon compound containing an average of more than 2 aminoxy groups per molecule, an inorganic filler and a primary or secondary alcohol containing acetylenic unsaturation, i.e., a carbon-to-carbon triple bond. The alcohol is considered indispensible for obtaining a cured material wherein the internal portion exhibits a degree of elasticity characteristic of a sealant and the exposed surfaces are sufficiently adhesive to be coatable with paints as defined hereinbefore.

It is an objective of this invention to define curable polyorganosiloxane compositions exhibiting coatability with various types of paints following curing.

SUMMARY OF THE INVENTION

This invention provides room temperature vulcanizable polyorganosiloxane compositions that are paintable following curing, said composition comprising a hydroxyl-terminated polyorganosiloxane, an organosilicon compound containing at least two amido or aminoxy groups or a combination thereof as the curing agent and an alcohol containing specified substituents to impart paintability to the cured sealant compositions. The compositions may contain fillers such as silica and calcium carbonate in addition to other additives that are conventionally present in polyorganosiloxane sealant compositions.

DETAILED DESCRIPTION OF THE INVENTION

This invention provides a room temperature vulcanizable polyorganosiloxane composition comprising (A) 100 parts by weight of a hydroxyl-terminated polyorganosiloxane exhibiting a viscosity of from 0.02 to 1000 Pa.s at 25° C.; (B) from 0.5 to 30 parts by weight of at least one organosilicon compound containing at least two functional groups selected from the group consisting of amido and aminoxy; and (C) from 0.01 to 15 parts by weight of an alcohol containing a substituent selected from the group consisting of acyloxy, alkoxycarbonyl, carboxy, cyano,

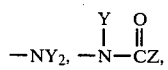

mercapto, and the combination of a carbon-to-carbon triple bond and at least one ether-type oxygen atom. In the foregoing formulae each Y and Z are individually selected from the group consisting of hydrogen, hydrocarbyl, and halohydrocarbyl.

As used in this specification and accompanying claims, the term "ether-type oxygen atom" refers to an oxygen atom that is bonded to two carbon atoms that are, in turn, bonded to carbon or hydrogen atoms, and the halogen portion of any halohydrocarbyl radical is chlorine, bromine or fluorine.

The hydroxyl-terminated polyorganosiloxane, identified hereinbefore as component (A) of the present compositions is the base material of the compositions, and is preferably an α,ω-dihydroxypolydiorganosiloxane represented by the general formula HO$\pm$R$_2$SiO]$_n$H where each R$^7$ is selected from the group consisting of hydrocarbyl halohydrocarbyl and cyanohydrocarbyl, and the value of n represents an average degree of polymerization such that the polydiorganosiloxane exhibits a viscosity within the range from 0.02 to 1000 Pa.s at 25° C. Polyorganosiloxanes wherein the linear chain characteristic of polydiorganosiloxane molecules is branched in part and the molecule contains 3 or more hydroxyl groups can be used in the present polyorganosiloxane compositions.

Typical radicals represented by R$^7$ in the aforementioned formula include alkyl such as methyl, ethyl, propyl, and octyl; alkenyl such as vinyl and allyl; aryl such as phenyl and tolyl; haloalkyl such as chloromethyl and 3,3,3-trifluoropropyl; and cyanoalkyl such as cyanoethyl. Preferably at least 70% of the radicals represented by R$^7$ are methyl. This preference is based on the ease with which these polydiorganosiloxanes are synthesized and the combination of an appropriate viscosity of the uncured composition and the mechanical properties exhibited by post-cured compositions. Most preferably all of the R$^7$ radicals are methyl.

When the viscosity of the polyorganosiloxane is less than about 0.02 Pa.s, the cured elastomer will not exhibit the excellent physical properties, particularly flexibility and elongation, that characterize the cured compositions of this invention. Uncured compositions wherein the viscosity of the polydiorganosiloxane is greater than about 1,000 Pa.s exhibit poor workability during coating. The viscosity of the polyorganosiloxane employed as component (A) of the present compositions should therefore be within the range from 0.02 to 1000 Pa.s, and preferably from 0.2 to 200 Pa.s.

The present compositions can be cured using an organosilicon compound, identified hereinbefore as component (B), which reacts with the hydroxyl groups of the polyorganosiloxane, component (A), at room temperature and in the presence of moisture to crosslink and cure the polyorganosiloxane. To perform this function component (B) contains at least two amide and/or aminoxy groups per molecule that are bonded to silicon through the nitrogen atom of the amido group or the oxygenation of the aminoxy group. If component (A) contains an average of three or more silicon-bonded hydroxyl groups per molecule, the polyorganosiloxane can be crosslinked and cured in the presence of an organosilicon compound containing only two amide and/or aminoxy groups per molecule or a mixture of organosilicon compounds containing two and three of these groups per molecule. Component (B) can be a silane, a linear siloxane or a cyclosiloxane, and preferably contains more than two amido or aminoxy groups per molecule.

Examples of amide group-containing organosilicon compounds are amidosilanes such as dimethylbis(N-methylacetamido)silane, dimethylbis(N-ethylacetamido)silane, methylvinylbis(N-methylacetamido)silane, methylvinylbis(N-butylacetamido)silane, methyl tris (N-phenylacetamido)silane, vinyltris(N-ethylacetamido)silane and tetrakis(N-methylacetamido)silane; amidosiloxanes such as

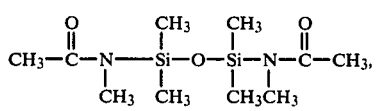

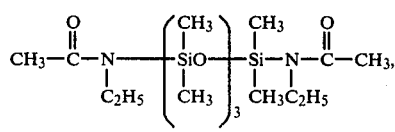

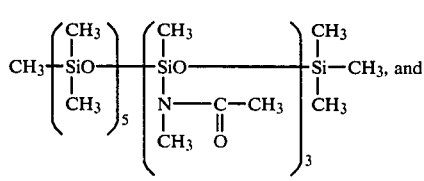

and amidocyclosiloxanes such as

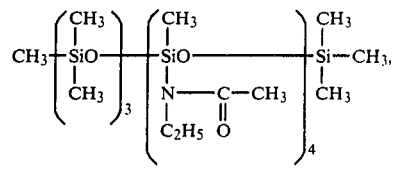

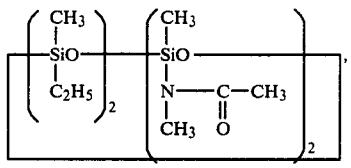

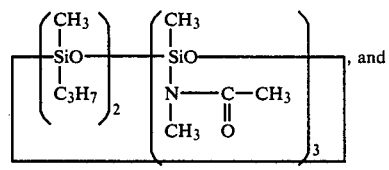

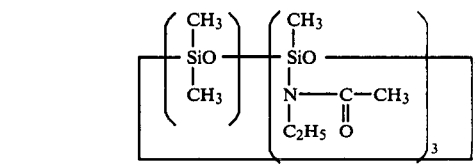

The aminoxy group-containing organosilicon compound includes aminoxysilanes such as diphenylbis(diethylaminoxy)silane, methyltris(diethylaminoxy)silane and

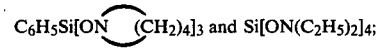

aminoxysiloxanes such as

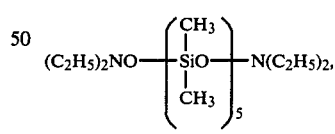

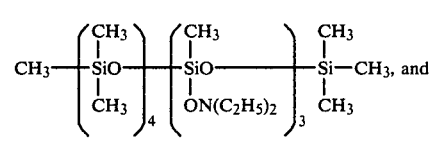

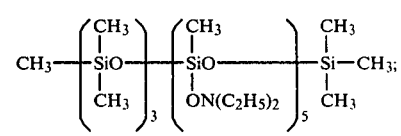

and aminoxycyclosiloxanes such as

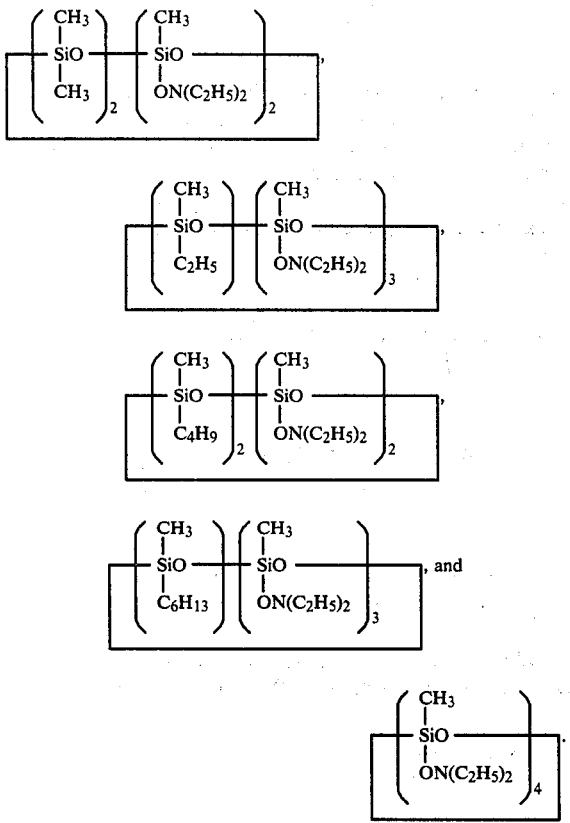

Although organosilicon compounds which contain both an amide and an aminoxy group in a single molecule can be used, such compounds are generally not used because of the difficulty and high cost of synthesizing these compounds.

Component (B) can be a single amide group-containing organosilicon compound or a mixture of two or more amide group-containing organosilicon compounds, a single aminoxy group-containing organosilicon compounds or a mixture of two or more aminoxy group-containing organosilicon compounds or a mixture of amide and aminoxy compounds.

The average number of amide or aminoxy groups per molecule of (B) should exceed 2 in order to react with, crosslink, and cure (A) which is usually a hydroxyl-terminated linear polydiorganosiloxane. Curing will be inadequate when an average of fewer than two of these groups is present. Needless to say, this invention also includes compositions in which a molecule of (B) contains 3, 4, or more amide or aminoxy groups; however, a mixture of (B) molecules which contain 2 amide or aminoxy groups and molecules which contain 3 or more amide or aminoxy groups is preferred for practical applications. The relative numbers of amide and aminoxy groups in (B) is not critical. In mixtures containing both bifunctional and polyfunctional (B), it is desirable that the bifunctional component be the more reactive one in order to obtain a low modulus-high elongation cured product and achieve single-package storage stability. Amide group-containing organosilicon compounds are usually more reactive than aminoxy group-containing organosilicon compounds. For this reason, it is generally preferred to use a (B) compound containing two amide groups in combination with a (B) compound containing 3 or more amino or aminoxy groups. On the other hand, when an aminoxy group-containing organosilicon compound is used as the bifunctional (B) compound, it is generally preferred to use it in combination with a (B) compound containing 3 or more aminoxy groups.

When the relative concentration of curing agent (B) is too small, curing is inadequate or single-package storage stability is poor. On the other hand, when the relative amount of (B) is too large, the curing rate is slow and the composition becomes uneconomical. For this reason, the concentration of (B) is from 0.5 to 30 parts by weight, preferably from 1 to 20 parts by weight, per 100 parts by weight of polyorganosiloxane (A).

The substituted alcohol, referred to hereinbefore as (C), is an essential ingredient of the present compositions because it allows the cured product to be painted. When component (C) is added, the aforementioned surface is easily coated with various types of paints. When component (C) is omitted, the surface of the cured elastomer is either difficult to paint or cannot be painted. Component (C) must contain at least one substituent selected from acyloxy, alkoxycarbonyl, carboxy, cyano, amino, amido, mercapto, and the combination of a carbon-to-carbon triple bond with an ether-type oxygen atom, as defined hereinbefore.

In addition to the aforementioned substituents component (C) also contains at least one alcoholic hydroxyl group, corresponding to the formula

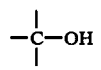

wherein the three valences not satisfied by the hydroxyl group are satisfied by hydrogen atoms and at least one hydrocarbon radical. One of these hydrocarbon radicals contains the aforementioned substituent which characterizes the alcohol as component (C) of the present composition.

The number of hydroxyl groups per molecule of component (C) is not critical, however, a monohydric or dihydric alcohol is preferred from the standpoint of availability and cost. In order to obtain a preferred composition of this invention, one of the aforementioned substituents and an alcoholic hydroxyl group must both be present in each molecule of component (C). A compound possessing only the hydroxyl group or one of the aforementioned substituents cannot achieve this objective. The aforementioned substituent increases the adhesiveness of a paint to the cured composition. Although only one substituent must be present in a molecule, 2 or more identical or different substituents can be present. Compounds possessing only one such substituent are preferred, based on availability and cost. The alcoholic hydroxyl group is required for binding component (C) to the cured composition. As discussed hereinabove, the surface of the cured composition is coatable with various types of paints due to the presence of both the aforementioned substituents and the alcoholic hydroxyl group on (C).

Specific classes of substituted alcohols that can be used as component (C) will now be discussed in detail.

The alcohol compound containing both a carbon-carbon triple bond and at least one ether-type oxygen atom is a compound in which a single molecule contains a —C≡C— bond, ≡C—O—C≡ bond. and ≡C—OH bond. The —C≡C— bond is necessary for imparting paintability. The ≡C—O—C≡ bond imparts a moderate degree of hydrophobicity to the alcohol compound in order to increase the compatibility of component (C) with the organopolysiloxane (A), and this bond also increases compatibility of the cured composition with both oil-base and water-base paints. Alcohols possessing a terminal —C≡C— bond are preferred, but not mandatory. Preferred alcohols containing a carbon-to-carbon triple bond and an ether-type oxygen atom have an acetylenically unsaturated hydrocarbon radical represented by the formula

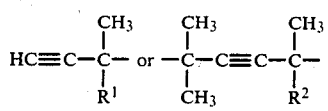

where $R^1$ represents methyl, ethyl or isobutyl, $R^2$ represents methyl or ethyl and the ether-type oxygen atom is bonded to said hydrocarbon radical and either a hydroxyalkyl radical or a hydroxyl-terminated polyoxyalkylene radical, where the alkylene portion of said polyoxyalkylene radical is ethylene, propylene or a combination thereof and the alkyl portion of said hydroxyalkyl radical is ethyl or propyl.

Representative preferred alcohols include

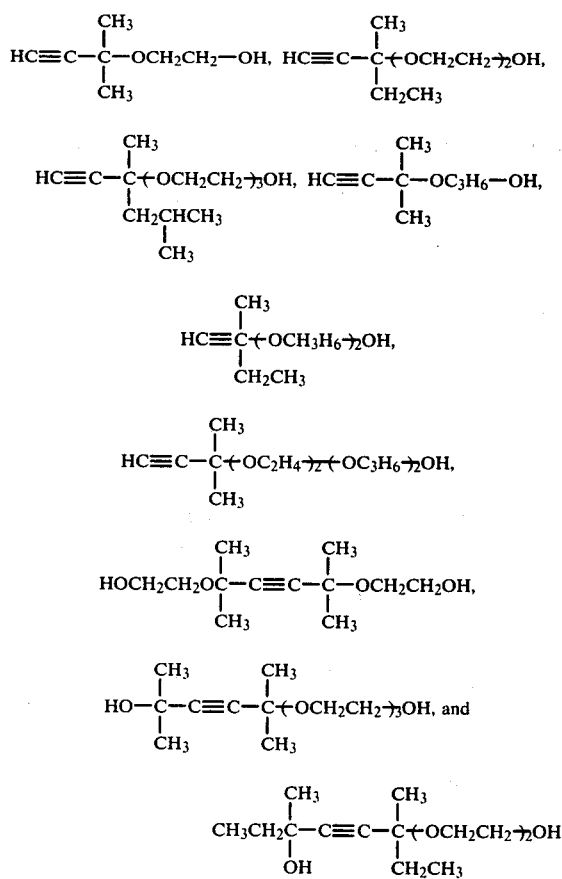

Acyloxy group-containing alcohols can be defined by the general formula

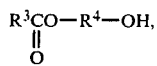

where $R^3$ represents a monovalent hydrocarbon radical, or a monovalent halohydrocarbon radical where the halogen is chlorine, bromine or fluorine, and $R^4$ represents a bivalent hydrocarbon radical or a bivalent halohydrocarbon radical. $R^3$ preferably possesses ethylenic unsaturation. Representative alcohols of this type include

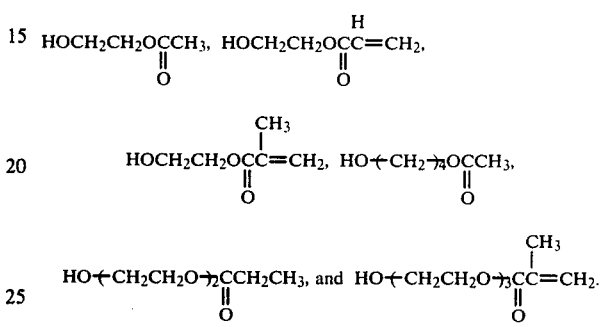

Alkoxycarbonyl- and carboxy group-containing alcohols can be represented by the general formula

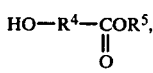

where $R^4$ is as defined hereinbefore and $R^5$ represents a hydrogen atom, a monovalent hydrocarbon radical, or a monovalent halohydrocarbon radical. Representative alcohols of this type include

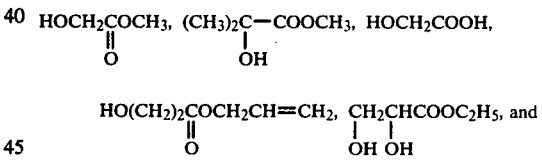

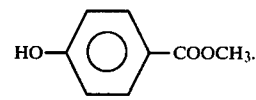

Cyano group-containing alcohols can be presented by the general formula

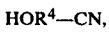

HOR⁴—CN, where $R^4$ is as defined hereinbefore. Representative alcohols of this type include

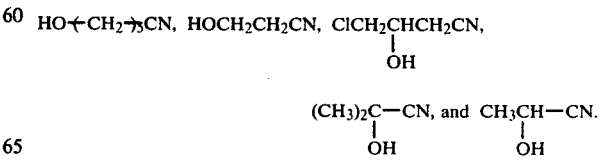

Amino group-containing alcohols can be represented by the general formula $$R^5-\underset{\underset{R^6}{|}}{N}-R^4-OH,$$

where $R^4$ and $R^5$ are as defined hereinbefore and $R^6$ represents a hydrogen atom, a monovalent hydrocarbon radical, or a monovalent halohydrocarbon radical. Representative alcohols of this type include $$(CH_3)_2NCHCH_2CH-OH, \ H_2N(CH_2)_6OH, \ H_2NCH_2CH_2OH,$$
(with CH₃ groups on the first two carbons)

$(CH_3)_2NCH_2CH_2OH$, $HN(CH_2CH_2OH)_2$, $N(CH_2CH_2OH)_3$, $(C_2H_5)_2N-CH_2CH_2OCH_2CH_2OH$, $C_4H_9NHCH_2CH_2CH_2OH$, $$(CH_3)_2NCH_2CH_2CH_2\underset{\underset{C_2H_5}{|}}{\overset{\overset{C_2H_5}{|}}{C}}OH, \ H_2NCH(CH_2OH)_2,$$

$H_2NCH_2CH_2NHCH_2CH_2OH$, and $CH_2=CHCHCH_2NH_2$.
                                              $|$
                                              $OH$ The amide group-containing alcohol compounds can be represented by the general formula $$R^5-\overset{O}{\overset{\|}{C}}-\underset{\underset{}{\overset{\overset{R^6}{|}}{N}}}{}-R^4-OH$$

where $R^4$, $R^5$ and $R^6$ are as defined hereinbefore. Representative alcohols of this type include $$H\overset{O}{\overset{\|}{C}}-\underset{\underset{}{\overset{\overset{H}{|}}{N}}}{}-CH_2CH_2OH, \ CH_3\overset{O}{\overset{\|}{C}}-\underset{\underset{}{\overset{\overset{H}{|}}{N}}}{}-CH_2CH_2OH,$$

$$CH_3\overset{O}{\overset{\|}{C}}-\underset{\underset{}{\overset{\overset{CH_3}{|}}{N}}}{}CH_2CH_2CH_2OH, \ CH_3CH_2\overset{O}{\overset{\|}{C}}-\underset{\underset{}{\overset{\overset{H}{|}}{N}}}{}(CH_2)_6OH, \text{ and}$$

$$CH_3\overset{O}{\overset{\|}{C}}N(CH_2CH_2OH)_2.$$

Mercapto group-containing alcohols can be represented by the general formula $$HS-R^4-OH$$

where $R^4$ is as defined hereinbefore. Representative alcohols of this type include $HSCH_2CH_2OH$, $HSCH_2CHCH_2OH$, and $HSCH_2CH_2CH_2OH$.
                        $|$
                        $OH$ The relative concentration of component (C) is from 0.01 to 15 parts by weight, preferably from 0.05 to 5 parts by weight per 100 parts by weight of component (A). When this concentration is less than the lowest value specified hereinabove, paintability is unsatisfactory for practical purposes. On the other hand, using more than 15 parts by weight of the alcohol becomes uneconomical.

In addition to components (A), (B), and (C), ultrafine inorganic fillers are desirably added to the composition of this invention in order to improve the flow characteristics of the uncured compositions, and in order to provide the mechanical properties required of a cured sealant. The concentration of these inorganic fillers is typically from 5 to 500 parts by weight and preferably from 20 to 300 parts by weight per 100 parts by weight of component (A). Examples of inorganic fillers include fume silica, calcined silica, precipitated silica, powdered quartz, calcium carbonate, titanium dioxide, diatomaceous earth, aluminum hydroxide, alumina, and the foregoing fillers whose surfaces have been treated with silanes, silazanes, low molecular-weight siloxanes, or other organic compounds. Calcium carbonate is a preferred filler when a low modulus-high elongation construction sealant is desired. In addition, organic solvents, fungicides, flame retarders, plasticizers, thixotropic agents and adhesion promoters can be added to the compositions of this invention.

Cured compositions produced by the method of this invention differ from conventional silicone sealants with respect to their paintability with various types of paints. For this reason, these compositions can be advantageously used to seal joints on the exterior surfaces of building walls which are to be subsequently painted. An additional feature is the ability to paint a cured sealant to match or contrast with the color of adjacent structural members. Previously it was necessary to add a pigment to the uncured sealant composition to achieve this result.

Embodiments of the present invention are described in the following examples. All parts are by weight and the following abbreviations are employed: $M_{50}$=modulus at 50% elongation, $T_{max}$=maximum tensile strength, and $E_{max}$=elongation at maximum load.

The coatability and adhesion tests referred to in the examples were conducted as follows.

Coatability Test

A composition of this invention or, in the case of comparison examples, a control composition was shaped and cured to form a 2.5 mm thick sheet. One layer of paint was applied to a square area of 25 cm² using a brush and the coatability of the surface was rated using 3 categories, represented by symbols in the accompanying tables. A 1 indicates a uniform coating, a 2 indicates formation of a coating over 50 to 90% of the test area, and an 3 indicates a coating covering 40% or less of the test area.

Adhesion Test

Those samples which did not exhibit a 1 rating in the coatability test were coated with several layers of paint in an attempt to cover the entire test area before subjecting them to the adhesion test. When the paint on all samples had completely cured, an 18 mm-wide strip of cellophane tape was adhered to the surface of the cured paint and then pulled off to determine adhesion of the paint film to the test surface. A rating of 1 indicates excellent adhesion, a rating of 3 indicates that the paint film peeled away from the test area with almost no resistance and a rating of 2 is intermediate between a rating of 1 and 3.

EXAMPLE 1

A composition was prepared by combining 100 parts of a α,ω-dihydroxypolydimethylsiloxane exhibiting a viscosity of 4 Pa.s at 25° C., 30 parts of fine light calcium carbonate, 40 parts of light calcium carbonate and mixing to obtain a homogeneous material. The resultant base (100 parts) was combined with 2 parts of

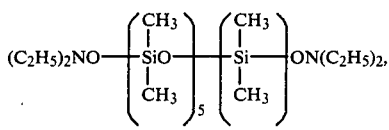

2 parts of

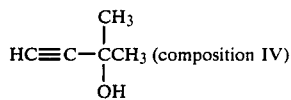

was used in place of a component (C) of this invention or no alcohol was included in the composition (composition V). All of the comparison compositions were formed into 2.5 cm-thick sheets and tested for coatability and adhesion. The comparison compositions were also formed into H-joints and tested to determine $M_{50}$, $T_{max}$ and $E_{max}$ as described hereinabove. The results of the foregoing tests are summarized in Table 1.

TABLE 1

| Composition | Paint[1] Coat-ability | Paint[1] Adhesion | Paint[2] Coat-ability | Paint[2] Adhesion | Paint[3] Coat-ability | Paint[3] Adhesion | $M_{50}$ (kg/cm$^2$) | $T_{max}$ (kg/cm$^2$) | $E_{max}$ (%) |
|---|---|---|---|---|---|---|---|---|---|
| This Invention | | | | | | | | | |
| I | 1 | 1 | 1 | 1 | 1 | 1 | 0.9 | 4.6 | 820 |
| II | 1 | 1 | 1 | 1 | 1 | 1 | 1.1 | 5.9 | 920 |
| Comparison | | | | | | | | | |
| III | 3 | 3 | 1 | 2 | 1 | 3 | 1.5 | 6.5 | 840 |
| IV | 3 | 3 | 1 | 2 | 1 | 3 | 1.8 | 7.3 | 710 |
| V | 3 | 3 | 1 | 2 | 1 | 3 | 1.8 | 7.7 | 860 |

[1]Synthetic resin emulsion (Vinyldelux 300 from Kansai Paint Co., Ltd.)
[2]Polyurethane paint (Rethan 4000 from Kansai Paint Co., Ltd.)
[3]Acrylic resin paint (AP Paint from Kansai Paint Co., Ltd.)

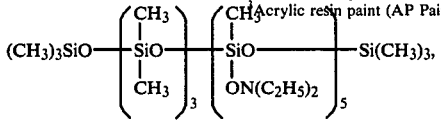

and either 0.3 part of $(CH_3)_2NCH_2CH_2OH$ (composition I) or 0.4 part of

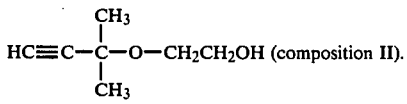

The two resultant compositions were each formed into 2.5 mm-thick sheets which were subsequently allowed to cure at room temperature for 1 week to form elastomers. Each sample was then tested using the aforementioned coatability test followed by the aforementioned adhesion test. Samples of each composition were formed into H-joints as specified in JIS-A5758 using Primer D manufactured by Toray Silicone Co., Ltd., allowed to stand at room temperature for 2 weeks and then tested to determine $M_{50}$, $T_{max}$ and $E_{max}$.

In the comparison examples, compositions were prepared by a method identical to the foregoing with the exceptions that either 0.3 part of ethanol (composition III) or 0.4 part of $$HC\equiv C-\underset{\underset{OH}{|}}{\overset{\overset{CH_3}{|}}{C}}-CH_3 \text{ (composition IV)}$$

EXAMPLE 2

Compositions VI–XIII were prepared using the method of Example 1 with the exception that the following substituted alcohols were used in place of those listed in Table 1. The cured compositions were evaluated as described in Example 1 and the results are summarized in Table 2.

| Composition | Alcohol | Parts |
|---|---|---|
| VI | $CH_2=\underset{\underset{CH_3}{|}}{C}-COOC_2H_4OH$ | 0.1 |
| VII | $CH_2=CH-COOC_2H_4OH$ | 0.5 |
| VIII | $(HOCH_2)_2\underset{\underset{CH_3}{|}}{C}-NH_2$ | 1.0 |
| IX | $HOCH_2CH_2CN$ | 0.2 |
| X | $(CH_3)_2\underset{\underset{OH}{|}}{C}-COOCH_3$ | 0.5 |
| XI | $(CH_3)_2\underset{\underset{CN}{|}}{C}-OH$ | 0.5 |
| XII | $CH_3\underset{\underset{O}{\|}}{C}NHCH_2CH_2OH$ | 0.3 |
| XIII | $HOCH_2COOH$ | 0.5 |

TABLE 2

| Composition | Paint[1] Coat-ability | Paint[1] Adhesion | Paint[2] Coat-ability | Paint[2] Adhesion | Paint[3] Coat-ability | Paint[3] Adhesion | $M_{50}$ (kg/cm$^2$) | $T_{max}$ (kg/cm$^2$) | $E_{max}$ (%) |
|---|---|---|---|---|---|---|---|---|---|
| VI | 2 | 1 | 1 | 1 | 1 | 1 | 0.8 | 4.3 | 960 |
| VII | 2 | 1 | 1 | 1 | 1 | 1 | 1.4 | 5.1 | 740 |
| VIII | 1 | 1 | 1 | 1 | 1 | 1 | 1.5 | 5.6 | 710 |

TABLE 2-continued

| Composition | Paint[1] Coat-ability | Adhesion | Paint[2] Coat-ability | Adhesion | Paint[3] Coat-ability | Adhesion | $M_{50}$ (kg/cm²) | $T_{max}$ (kg/cm²) | $E_{max}$ (%) |
|---|---|---|---|---|---|---|---|---|---|
| IX | 1 | 1 | 1 | 1 | 1 | 1 | 0.7 | 3.6 | 880 |
| X | 2 | 1 | 1 | 1 | 1 | 2 | 1.6 | 6.7 | 790 |
| XI | 1 | 1 | 1 | 1 | 1 | 1 | 1.2 | 6.1 | 930 |
| XII | 2 | 1 | 1 | 1 | 1 | 1 | 1.8 | 7.2 | 830 |
| XIII | 2 | 1 | 1 | 1 | 1 | 2 | 1.3 | 5.2 | 890 |

Paints A, B and C are defined in Table 1

EXAMPLE 3

A mixture containing 100 parts of a α,ω-dihydroxypolydimethylsiloxane exhibiting a viscosity of 9 Pa.s at 25° C., 40 parts of fine light calcium carbonate and 50 parts of heavy calcium carbonate was blended to homogeniety. A 100 part portion of the resultant composition were blended to homogeniety with 3.5 parts of

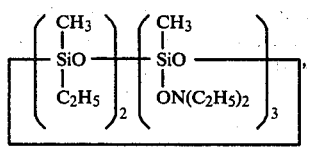

0.5 part of

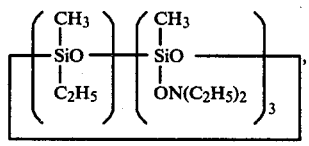

and one of the following substituted alcohols as component (C). The resulting compositions were cured and tested using the methods of Example 1.

For comparative purposes, compositions were prepared and tested by methods identical to the above with the exception that a component (C) was not added (composition XXII) or an alcohol outside the scope of this invention was used instead of component (C) (compositions XX and XXI). The results are reported in Table 3.

| Composition | Alcohol | Parts |
|---|---|---|
| XIV | $HC\equiv C-\underset{\underset{CH_3}{\mid}}{\overset{\overset{CH_3}{\mid}}{C}}-O(CH_2CH_2O)_2H$ | 0.4 |
| XV | $CH_2=\underset{\underset{COOC_2H_4OH}{\mid}}{\overset{\overset{CH_3}{\mid}}{C}}$ | 0.1 |
| XVI | $CH_2=CH-COOCH_2H_4OH$ | 0.5 |
| XVII | $(CH_3)_2NCH_2CH_2OH$ | 0.5 |
| XVIII | $(HOCH_2)_2\underset{\underset{NH_2}{\mid}}{\overset{\overset{CH_3}{\mid}}{C}}$ | 1.0 |
| XIX | $HSCH_2CH_2OH$ | 0.5 |
| XX (comparison) | $(CH_3)_2CHC\underset{\underset{OH}{\mid}}{\overset{\overset{}{}}{C}}\equiv CH$ | 0.5 |
| XXI (comparison) | $CH_3CH_2OH$ | 0.5 |
| XXII (comparison) | None | None |

TABLE 3

| Composition | Paint[1] Coat-ability | Adhesion | Paint[2] Coat-ability | Adhesion | Paint[3] Coat-ability | Adhesion | $M_{50}$ (kg/cm²) | $T_{max}$ (kg/cm²) | $E_{max}$ (%) |
|---|---|---|---|---|---|---|---|---|---|
| This Invention | | | | | | | | | |
| XIV | 1 | 1 | 1 | 1 | 1 | 2 | 1.2 | 5.6 | 950 |
| XV | 2 | 1 | 1 | 1 | 1 | 1 | 1.0 | 7.4 | 1120 |
| XVI | 2 | 1 | 1 | 1 | 1 | 1 | 1.2 | 5.4 | 980 |
| XVII | 1 | 1 | 1 | 1 | 1 | 1 | 1.3 | 5.8 | 850 |
| XVIII | 1 | 1 | 1 | 1 | 1 | 1 | 1.9 | 4.9 | 640 |
| XIX | 2 | 1 | 1 | 1 | 1 | 1 | 0.8 | 4.8 | 1240 |
| Comparisons | | | | | | | | | |
| XX | 3 | 3 | 1 | 3 1 | 3 | 1.9 | 4.7 | 630 | |
| XXI | 3 | 3 | 1 | 3 | 1 | 3 | 0.2 | 1.9 | 1260 |
| XXII | 3 | 3 | 1 | 3 | 1 | 3 | 1.9 | 4.4 | 570 |

Paints A, B and C are defined in Table 1.

EXAMPLE 4

A mixture containing 100 parts of an α,ω-dihydroxypolydimethylsiloxane exhibiting a viscosity of 12 Pa.s at 25° C., 30 parts of fine light calcium carbonate and 70 parts of heavy calcium carbonate was blended to homogeniety. A 100 part portion of the resultant composition was blended with 6 parts of dimethylbis(N-ethylacetamido)silane, and 0.5 part of

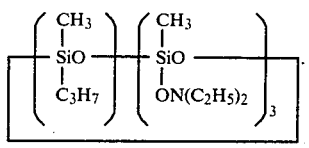

A 0.5 portion of (CH₃CH₂)₂NCH₂CH₂OH was also added as component (C). This composition was formed into a 2.5 mm thick elastomer sheet and cured. The cured product was evaluated using the tests for coatability and adhesion described hereinbefore. The results of these tests demonstrate that paints A, B, and C described in Table 1 all exhibited good coatability and adhesion on the cured elastomer.

EXAMPLE 5

A composition was prepared using the method of Example 4 with the exception that a hydroxyl-terminated dimethylsiloxane-methylphenylsiloxane copolymer containing 95 mol % of dimethylsiloxane units and 5 mol % of phenylmethylsiloxane units and exhibiting a viscosity of 11 Pa.s at 25° C. was used instead of the α,ω-dihydroxypolydimethylsiloxane. The resulting composition was evaluated using the aforementioned coatability and adhesion tests with the same results reported in Example 4.

EXAMPLE 6

A composition was prepared by the method of Example 4 with the exception that a hydroxyl-terminated dimethylsiloxane-methyl(3,3,3-trifluoropropyl)siloxane copolymer containing 99 mol % of dimethylsiloxane units and 1 mol % methyl(3,3,3-trifluoropropyl)siloxane units and exhibiting a viscosity of 10 Pa.s at 25° C. was used instead of the α,ω-dihydroxypolydimethylsiloxane. The cured composition was examined using the aforementioned coatability and adhesion tests with the same results reported in Example 4.

That which is claimed is:

1. A room temperature vulcanizable polyorganosiloxane composition comprising
    (A) 100 parts by weight of a hydroxyl-terminated polyorganosiloxane exhibiting a viscosity of from 0.02 to 1000 Pa.s at 25° C.;
    (B) from 0.5 to 30 parts by weight of at least one organosilicon compound containing at least two functional groups selected from the group consisting of amido and aminoxy; and
    (C) from 0.01 to 15 parts by weight of an alcohol containing a substituent selected from the group consisting of acyloxy, alkoxycarbonyl, carboxy, cyano,

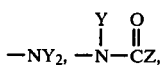

mercapto, and the combination of a carbon-to-carbon triple bond and at least one ether-type oxygen atom, where each Y and Z are individually selected from the group consisting of hydrogen, hydrocarbyl, and halohydrocarbyl.

2. The composition of claim 1 where said alcohol is monohydric or dihydric.

3. The composition of claim 2 where said alcohol contains a

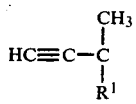

radical or a

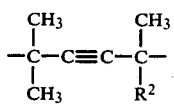

radical and an ether-type oxygen atom, where R¹ represents methyl, ethyl or isobutyl, R² represents methyl or ethyl and said oxygen atom is bonded to the

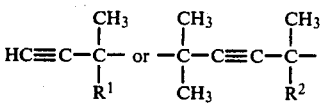

radical and either a hydroxyalkyl radical or a hydroxyl-terminated polyoxyalkylene radical, where the alkylene portion of said polyoxyalkylene radical is ethylene, propylene or a combination thereof and the alkyl portion of said hydroxyalkyl radical is ethyl or propyl.

4. The composition of claim 1 where said alcohol is represented by a general formula selected from the group consisting of

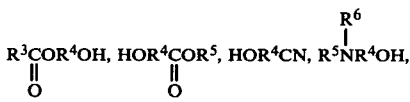

where R³ represents a monovalent hydrocarbon radical or a monovalent halohydrocarbon radical where the halogen is chlorine, bromine, or fluorine, R⁴ represents a bivalent hydrocarbon radical or a bivalent halohydrocarbon radical, R⁵ and R⁶ are individually selected from the group consisting of hydrogen atoms, monovalent hydrocarbon radicals, and monovalent halohydrocarbon radicals.

5. The composition of claim 1 wherein said alcohol is selected from the group consisting of

HC≡CC(CH₃)₂OC₂H₄OH, H₂C=C(CH₃)COOC₂H₄OH,

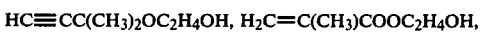

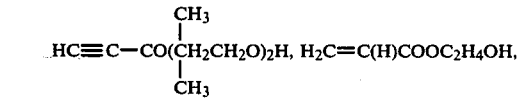

6. The composition of claim 1 where the concentration of said alcohol is from 0.05 to 5 parts by weight per 100 parts of said hydroxyl-terminated polyorganosiloxane.

7. The composition of claim 1 where component (B) is a silane, a linear siloxane or a cyclosiloxane and contains at least two amido or aminoxy groups per molecule that are bonded to silicon through the nitrogen atom of the amido group or the oxygen atom of the aminoxy group.

8. The composition of claim 1 where component (B) is a mixture of organosilicon compounds containing an average of more than two amido or aminoxy groups per molecule.

9. The composition of claim 8 where component (B) is a mixture of

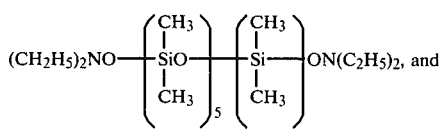

a mixture of

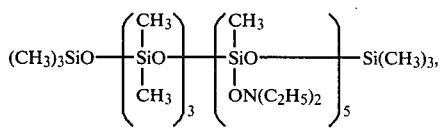

a mixture of

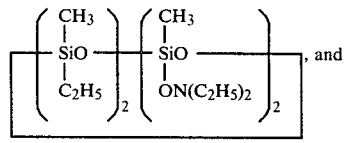

or a mixture of

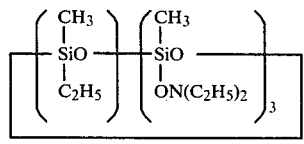

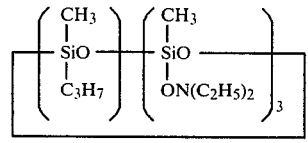

10. The composition of claim 1 where the concentration of component (B) is from 1 to 20 parts by weight per 100 parts of hydroxyl-terminated polyorganosiloxane (A).

11. The composition of claim 1 where the hydroxyl-terminated polyorganosiloxane is a $\alpha,\omega$-dihydroxypolydiorganosiloxane of the general formula HO$-(R_2{}^7SiO)_n$H where each $R^7$ is individually selected from the group consisting of hydrocarbyl, halohydrocarbyl and cyanohydrocarbyl radicals and substituted monovalent hydrocarbon radicals and the value of n represents an average degree of polymerization equivalent to a viscosity of from 0.02 to 1000 Pa.s at 25° C.

12. The composition of claim 11 where $R^7$ is selected from the group consisting of methyl, ethyl, propyl, octyl, vinyl, allyl, phenyl, tolyl, chloromethyl, 3,3,3-trifluoropropyl, and cyanoethyl.

13. The composition of claim 11 where at least 70% of the radicals represented by $R^7$ are methyl.

14. The composition of claim 1 wherein the hydroxyl-terminated polyorganosiloxane is an $\alpha,\omega$-dihydroxypolydimethylsiloxane.

15. The composition of claim 1 where the polydiorganosiloxane exhibits a viscosity of from 0.2 to 200 Pa.s at 25° C.

16. The composition of claim 1 where said composition contains from 5 to 500 parts by weight of a finely divided filler selected from the group consisting of fume silica, calcined silica, precipitated silica, powdered quartz, calcium carbonate, titanium dioxide, diatomaceous earth, aluminum hydroxide and alumina.

17. The composition of claim 16 where the filler is calcium carbonate.

18. The composition of claim 16 wherein the filler concentration is from 20 to 300 parts by weight.

* * * * *

UNITED STATES PATENT AND TRADEMARK OFFICE
CERTIFICATE OF CORRECTION

PATENT NO. : 4,447,576
DATED : May 8, 1984
INVENTOR(S) : Miyoji Fukayama, Chikara Ichiijo It is certified that error appears in the above-identified patent and that said Letters Patent is hereby corrected as shown below:

In column 7, line 45, "$HC\equiv C{\overset{\underset{|}{CH_3}}{\underset{\underset{CH_2CH_3}{|}}{}}}(OCH_3H_6)_2OH$" should read --- $HC\equiv C-C{\overset{\underset{|}{CH_3}}{\underset{\underset{CH_2CH_3}{|}}{}}}(OCH_3H_6)_2OH$ ---.

In column 10 line 46, "and an 3" should read -- and a 3 --.

In column 13, line 21, "were" should read -- was --.

UNITED STATES PATENT AND TRADEMARK OFFICE
CERTIFICATE OF CORRECTION

PATENT NO. : 4,447,576
DATED : May 8, 1984
INVENTOR(S) : Miyoji Kukayama, Chikara Ichiijo It is certified that error appears in the above-identified patent and that said Letters Patent is hereby corrected as shown below:

In column 13, line 25,

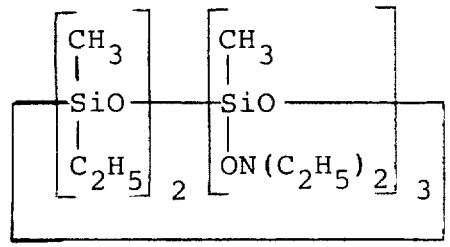 should read 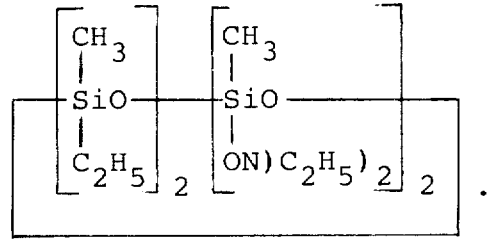 .

In column 14, "Table 3",

"XX    3    3    1    3 1    3    1.9    4.7    630" should read

-- XX    3    3    1    3    1    3    1.9    4.7    630 --.

Signed and Sealed this

Twelfth Day of March 1985

[SEAL]

Attest:

DONALD J. QUIGG

Attesting Officer        Acting Commissioner of Patents and Trademarks